(12) United States Patent
Levien

(10) Patent No.: US 8,810,579 B2
(45) Date of Patent: Aug. 19, 2014

(54) METHOD AND APPARATUS FOR INTERACTIVE CURVE GENERATION

(71) Applicant: Raphael L. Levien, Berkeley, CA (US)

(72) Inventor: Raphael L. Levien, Berkeley, CA (US)

( * ) Notice: Subject to any disclaimer, the term of this patent is extended or adjusted under 35 U.S.C. 154(b) by 0 days.

(21) Appl. No.: 13/961,984

(22) Filed: Aug. 8, 2013

(65) Prior Publication Data

US 2013/0321428 A1  Dec. 5, 2013

Related U.S. Application Data

(63) Continuation of application No. 11/752,260, filed on May 22, 2007, now Pat. No. 8,520,003.

(60) Provisional application No. 60/915,919, filed on May 3, 2007, provisional application No. 60/747,931, filed on May 22, 2006.

(51) Int. Cl.
    *G06T 11/00* (2006.01)
(52) U.S. Cl.
    USPC ........................................................ 345/442
(58) Field of Classification Search
    CPC ... G06T 11/203; G06T 2215/06; G06T 17/30; G06F 17/17
    See application file for complete search history.

(56) References Cited

U.S. PATENT DOCUMENTS

| 5,081,594 | A | 1/1992 | Horsley |
| 5,235,551 | A | 8/1993 | Sinofsky et al. |
| 5,295,238 | A | 3/1994 | Dickson |
| 5,471,574 | A | 11/1995 | Prasad |
| 5,636,338 | A | 6/1997 | Moreton |
| 5,731,820 | A | 3/1998 | Broekhuijsen |
| 5,781,714 | A | 7/1998 | Collins et al. |
| 5,949,435 | A | 9/1999 | Brock |
| 6,014,148 | A | 1/2000 | Tankelevich |

(Continued)

OTHER PUBLICATIONS

Gumhold, "Designing Optimal Curves in 2D", Jul. 2004, Spain, 16 pages.

(Continued)

*Primary Examiner* — James Thompson
*Assistant Examiner* — David H Chu
(74) *Attorney, Agent, or Firm* — Remarck Law Group PLC

(57) ABSTRACT

A system of curve generation takes a sequence of control points and constraint codes for each control point, and outputs a curve in which each of the constraints is satisfied. The set of constraints is chosen from the tangent angle, curvature, first derivative of curvature, and second derivative of curvature. The interactive curve design uses as its primitive, a curve whose curvature is a polynomial function of arclength (whose intrinsic equation is a polynomial). At each control point, a choice of G2 curvature continuity (tangent angle and curvature) or G4 curvature continuity (tangent angle and curvature plus first and second derivatives of curvature are continuous) is input. The desired curve is expressed as the solution to the chosen set of constraints.

20 Claims, 9 Drawing Sheets

(56) References Cited

U.S. PATENT DOCUMENTS

| | | |
|---|---|---|
| 6,441,823 B1 | 8/2002 | Ananya |
| 6,459,439 B1 | 10/2002 | Ahlquist et al. |
| 6,636,217 B1 | 10/2003 | Hill |
| 6,639,592 B1 | 10/2003 | Dayanand et al. |
| 7,057,616 B2 | 6/2006 | Motter et al. |
| 2003/0120427 A1* | 6/2003 | Chapman et al. .................. 702/6 |
| 2004/0085311 A1* | 5/2004 | Lee et al. ....................... 345/419 |
| 2005/0071021 A1 | 3/2005 | Weinhofer |
| 2005/0106998 A1 | 5/2005 | Lin et al. |
| 2005/0175238 A1* | 8/2005 | Rosel ............................ 382/173 |
| 2005/0190187 A1 | 9/2005 | Salesin et al. |
| 2005/0237342 A1* | 10/2005 | Stamm et al. .................. 345/613 |
| 2007/0116339 A1 | 5/2007 | Shen |

OTHER PUBLICATIONS

Hobby, "Smooth, Easy to Compute Interpolating Splines," Jan. 1985, Stanford University, Palo Alto, CA, 15 pages.

Knuth, "The Metafont Book", 1986, pp. 122-139, Addison-Wesley, Boston, MA.

Moreton, "Minimum Curvature Variation Curves, Networks, and Surfaces for Fair Free-Form Shape Design", 1992, University of California, Berkley, Berkley, CA, 228 pages.

Ohlin, "Splines for Engineers", Eurographics, 1987, pp. 555-565, Elservier Science Publishers, Holland.

* cited by examiner

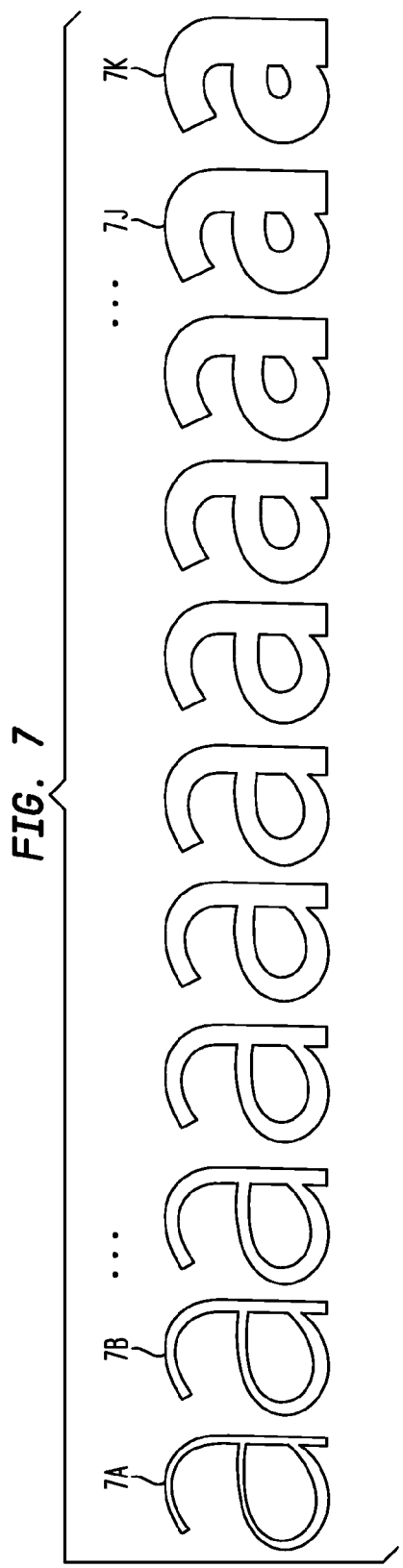

METHOD AND APPARATUS FOR INTERACTIVE CURVE GENERATION

CROSS-REFERENCE TO RELATED APPLICATIONS

This application is a continuation of U.S. patent application Ser. No. 11/752,260, filed May 22, 2007, which claims the benefit of U.S. Provisional Application No. 60/747,931, which was filed on May 22, 2006, and U.S. Provisional Application No. 60/915,919, which was filed on May 3, 2007. The disclosure of each of the above applications is incorporated herein by reference in its entirety.

FIELD OF THE INVENTION

The present invention relates to interactive curve design.

BACKGROUND OF THE INVENTION

The literature of curve interpolation techniques, otherwise known as "splines" is vast. A system for interactive design of curves should have the following properties: (a) The system should be capable of accurately representing a rich variety of curves with a minimum of input (measured as the number of control points); (b) The resulting curves should be smooth; (c) When moving control points, the effect on the curve should be direct and simple to understand; and (d) The computational resources should be modest enough to allow for update of the display at interactive rates. Much curve design, including most font design, is done using cubic Bezier curves. FIG. 3 shows a typical cubic Bezier segment with knots and additional control points. In a Bezier curve, some of the control points ("knots or knot points") lie on the curve (30, 36), but others lie off the curve (32, 34), and the position of the off-curve control points controls the shape of the curve. As the designer moves control points 32 and 34, the shape of the curve between control points 30 and 36 changes. This technique is simple to compute and very fast, and is good at representing a rich diversity of curves, but is not very simple to control. It is especially difficult to achieve smooth curves through the on-curve control points, and it takes considerable time and effort for designers to learn to do so. A particularly difficult aspect of curve design for font generation is making smooth transitions between straight and curved sections. Smoothness is a subjective quality, and there is no consensus in the literature on the best way to measure it, but one very commonly related objective measure closely connected to smoothness is the degree of continuity across the knot points. This continuity measure, in turn, is defined in terms of "curvature". Curvature is defined as the inverse of instantaneous radius, i.e., the inverse of the radius of the osculating circle that "kisses" the curve at every point. If the curvature exists at all points (i.e. there are no sharp corners), then the curve has G1 continuity.

If the curvature is also continuous through the control point, then it has G2 continuity. Higher degrees of continuity are defined in terms of derivatives of the curvature with respect to arclength. If the first derivative of curvature is continuous, then the curve has G3 continuity, and if the second derivative of curvature is also continuous, then the curve has G4 continuity. In general, cubic Bezier curves only guarantee G1 continuity. Another class of curve generation techniques involves "interpolating splines," or curves that go through ("interpolate") all the control points. One example used in practice for font design is "Smooth, Easy to Compute Interpolating Splines," by John Hobby, Stanford University, 1985 as implemented in the METAFONT system. In the prior art METAFONT spline, the range of choices for constraints is limited (the constraint is that of continuity of "mock curvature" across control points). In curve design, a primitive is defined as the basic element upon which more complex curves are built. The underlying primitive curve in the METAFONT system is a reduced family of cubic polynomials (with a two-dimensional parameter space). Another prior art system known as Ikarus, by Peter Karow, is similar to METAFONT.

Yet another class of interpolating spline techniques is the "variational approach," in which a curve is chosen to minimize some energy functional. Such techniques emulate mechanical splines based on thin strips of elastic material such as metal or wood. Examples include Gumhold (Designing Optimal Curves in 2D, Proc. CEIG, Jul. 2004 pages 61-76), and Moreton (Minimum Curvature Variation Curves, Networks and Surfaces for Fair Free-Form Shape Design, 1992 University of California, Berkeley Calif.). In general, variational techniques provide for a high degree of smoothness, but also require substantial computational resources. Moreton described MEC (Minimum Energy Curve) with G2 continuity and also MVC (Minimum Variation of Curvature) splines with G4 continuity.

SUMMARY OF THE INVENTION

The invention is a novel technique for interactive curve design, comprising several innovative features. Although the present invention is illustrated for use in conjunction with font design, the technique may be applied railroad track design, roadway design, and general CAD applications involving smooth curves.

In accordance with a first feature, the present invention uses as its primitive, a curve whose curvature is a polynomial function of arclength, i.e. whose intrinsic equation is a polynomial.

In accordance with a second feature, for each control point, the present invention allows for a choice of G2 or G4 curvature continuity.

In accordance with a third feature, the present invention provides for transitions between straight and curved sections, in which G2 continuity is preserved.

In the present system, the desired curve is expressed as the solution to a set of constraints. The set of constraints is chosen from the tangent angle, curvature, first derivative of curvature, and second derivative of curvature. In summary, the input to the system is a sequence of control points and constraint codes for each control point, and the output is a curve in which each of the constraints is satisfied.

DESCRIPTION OF THE DRAWING

FIG. 7 shows a family of font outlines of varying weight in accordance with the present invention, produced by linearly interpolating the control points.

DETAILED DESCRIPTION OF THE INVENTION

Figure 1:
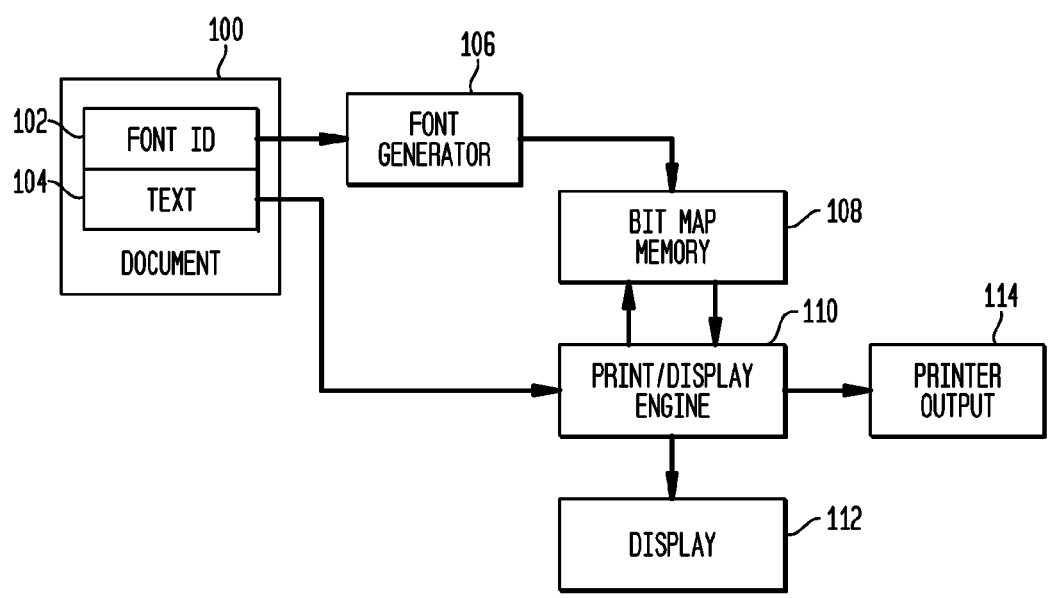
FIG. 1 illustrates the use of the present invention for font generation.

A system using the present invention for document printing is illustrated in FIG. 1. A document 100 includes text 104 and a font identifier (font ID) 102. The font ID 102 contains the control points (data points or knots) for each character in the chosen font.

Prior to printing or displaying the document 100, a font generator 106 renders each character, which is then stored in a bitmap memory 108. The present invention for curve generation finds its utility in the font generator 106 where the curves between control points are computed.

In order to print (or display) the document 100, individual characters of the text 104 contained in the document 100 are sent to the print/display engine 110, which uses the stored bitmap of each character in memory 108 to render the document 100 on a display 112 or generate a printer output 114.

Figure 2:
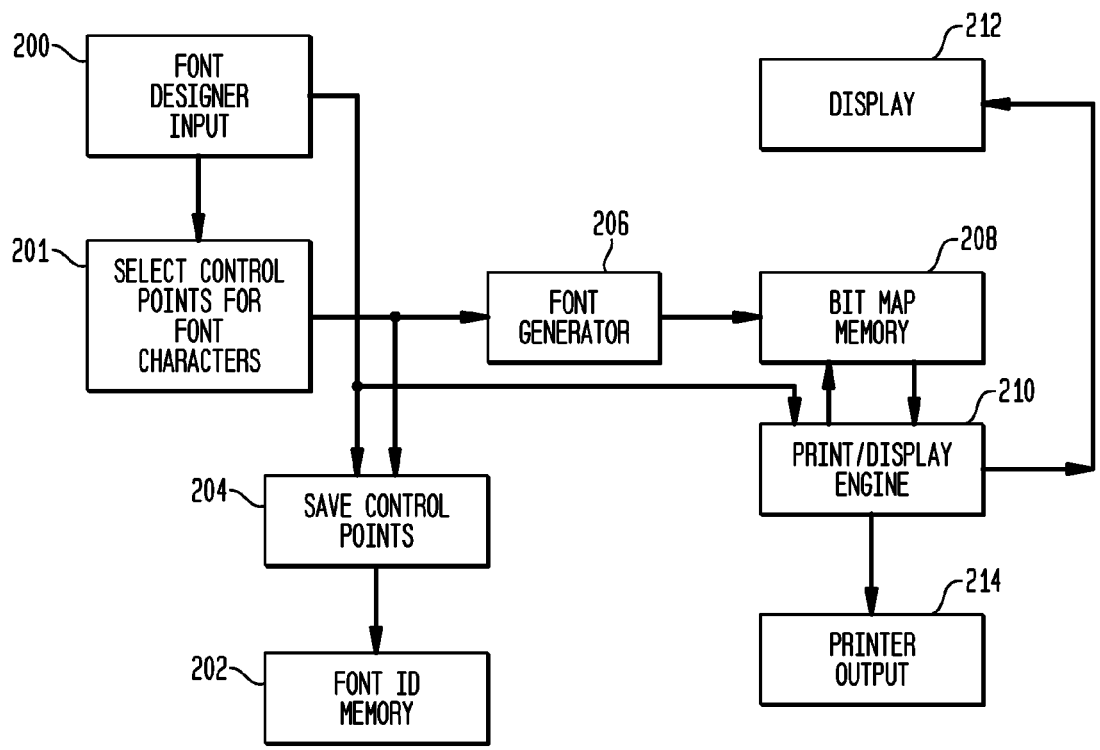
FIG. 2 illustrates the use of the present invention for interactive font design.
Figure 3:
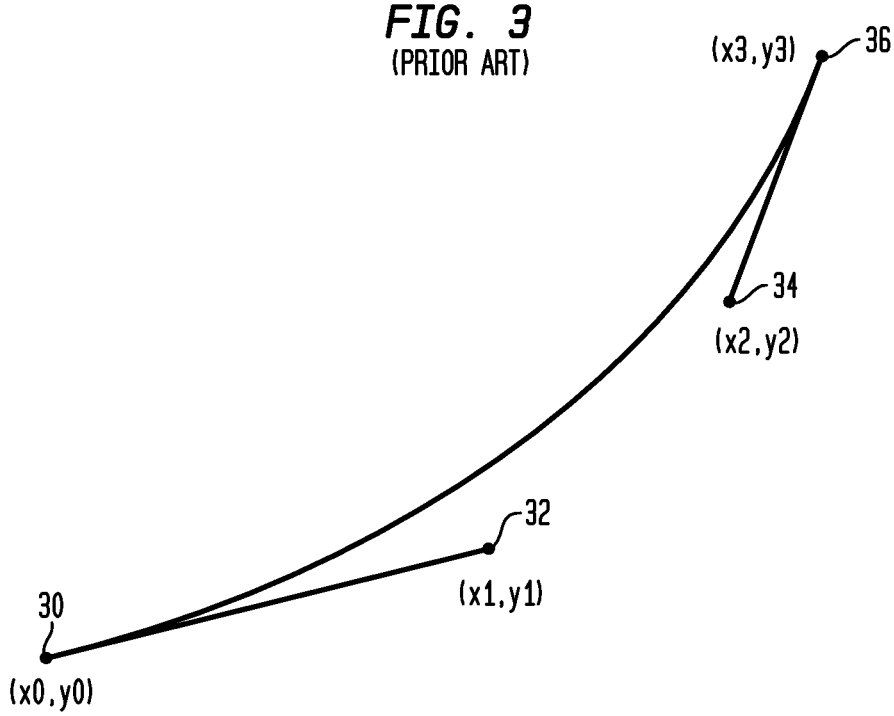
FIG. 3 illustrates a method of curve generation in accordance with the prior art.

An interactive system using the present invention for font design is illustrated in FIG. 2. The font designer provides input 200 in the form of selecting control points 201 that correspond to the shape of the desired font characters. The control points are sent to the font generator 206.

In accordance with the present invention, the font generator 206 computes the curves between the selected control points 201. The resulting bitmap for such character is stored in a bitmap memory 208. A print/display engine 210 generates a display 212 and/or a printed output 214 for evaluation by the font designer. The rapid computation of curves by the font generator 206 on the display 212 permits effective interactive font design. When the font designer is satisfied with the shape of the displayed character, the control points are saved 204 in a font ID memory 202.

Figure 8:
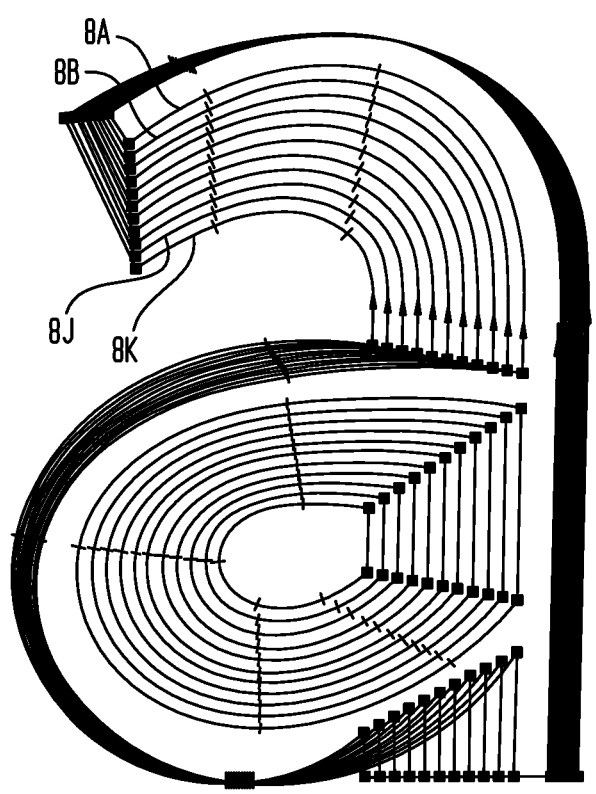
FIG. 8 shows the family of font outlines shown in FIG. 7, superimposed to show more clearly the relations between the curves of the different outlines.

The interactive qualities achieved by the use of the present invention are illustrated in FIG. 7 and FIG. 8. FIG. 7 shows the result using the present invention when the control points are linearly interpolated between two versions of a font outline. In particular, FIG. 7 shows a thin version 7A of a font linearly interpolated up to a thick version 7K of the same font. All such instances of the font 7A, 7B . . . , 7J, 7K, have G2 continuity everywhere (other than corners). By contrast, linearly interpolating Bezier control points, as in the Adobe Multiple Master technology, does not even guarantee G1 continuity in the general case.

FIG. 8 illustrates the same linear interpolation between a thin version 8A of a font linearly interpolated up to a thick version 8K of the same font. In particular, FIG. 8 shows a thin version 8A of a font linearly interpolated up to a thick version 8K of the same font superimposed upon each other. All such instances of the font 8A, 8B . . . , 8J, 8K, have G2 continuity everywhere (other than corners).

The Primitive Curve

The preferred primitive curve of the present invention is a third-order polynomial spiral. A polynomial spiral is a curve whose curvature expressed in terms of arclength (its "intrinsic equation") is given by a polynomial. Each such curve is characterized by four scalar parameters, which may be represented as the curvature and its first three derivatives at the midpoint of the curve. A few special cases are worth noting. If all four parameters are zero, then the curve is a straight line. If the curvature is nonzero but its derivatives are zero, then the curve is a circular arc of constant curvature. If the first two parameters are nonzero and the second and third derivatives of curvature are zero, then the curve is a clothoid, or a segment of the spiral of Cornu. Polynomial spirals are also known as "generalized clothoids".

The Constraints

Since each segment is a determined by four parameters, in a closed curve each point must have exactly four scalar constraints, to make sure that the resulting curve is fully determined.

A G4 constraint specifies that the tangent angle, curvature, first derivative of curvature, and second derivative of curvature must be equal across the control point.

A G2 constraint specifies that the tangent angle and curvature must be equal across the control point. To satisfy the requirement that each control point has a total of four scalar constraints, we add two additional constraints: the second derivative of curvature must be zero on both sides of the control point.

A one-way constraint with the straight side on the left and the curved side on the right is as follows. As in a G2 constraint, tangent angle and curvature must be equal across the control point. On the left (straight side), both first and second derivative of curvature must be zero.

The palette of constraints contains eight possible choices, namely the tangent angle, curvature, first derivative of curvature, and second derivative of curvature on one side of the control point, and the tangent angle, curvature, first derivative of curvature, and second derivative of curvature on the other side of the control point. In general, constraints at each control point can be written in terms of a linear combination of these eight possible parameters set equal to a constant (typically zero). Any set of four of these constraints is a valid set of constraints.

In an open curve, there is one more point than the number of segments, so the endpoints are treated specially. Each endpoint is assigned two constraints, specifically that the first and second derivatives of curvature are zero. In this way, the total number of constraints is always four times the number of segments, as required.

These constraints can be mixed freely and at will. The resulting curve, after solution of the spline, has a number of notable properties.

Figure 4:
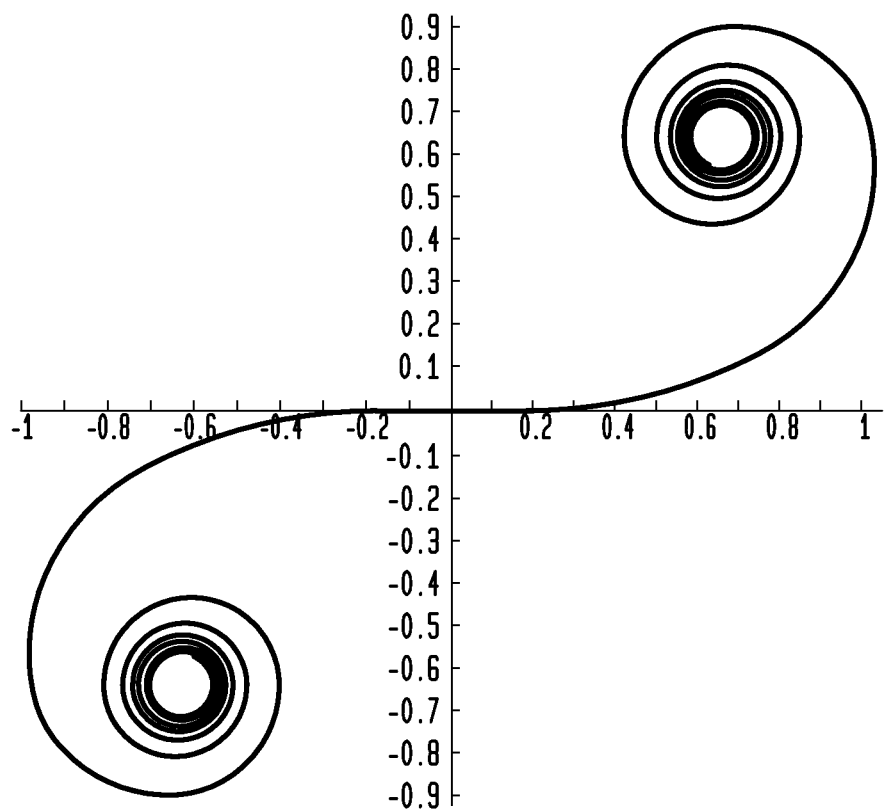
FIG. 4 is an example of an Euler spiral for use in conjunction with the present invention.

First, any segment bounded by a standard G2 constraint on both ends is a segment of an Euler spiral, also known as clothoid. A spline consisting entirely of G2 constraints is known as an Euler spiral spline. Euler's spiral, plotted in FIG. 4 over the range [−5, 5], is characterized by its intrinsic definition: curvature is linear with arclength, namely, $k(s)=s/2$.

Second, if all points have G4 control points, the spline described by Ohlin in "Splines for Engineers." spline is generated.

Third, if points are perturbed on the curved side of a one-way constraint, the curve on the straight side is not affected. In addition to providing for smooth straight-to-curved transitions, this property allows the construction of curves more robust with respect to perturbation, as may be useful when the control points themselves are parameterized or interpolated.

Implementation of the Constraint Solver

The core of the preferred embodiment of the present invention is a constraint solver specialized to the particular systems of constraints that will be solved: a sequence of segments each of which is a polynomial spiral controlled by four parameters, and an equal number of constraints written in terms of the tangent angles, curvatures, and derivatives of curvature at the endpoints of each of the segments.

In broad outline, the solver works as follows:

1. Determine initial values for all the parameters. One reasonable choice is all zeros, so that initially the segments are straight lines. The result of this step can be represented as a vector.
2. Evaluate the tangent angles, curvatures, and derivatives of curvature at the endpoints of each of the segments.
3. For each constraint, evaluate a quantity that represents the deviation from the constraint. For constraints of the form "quantity equals zero", this deviation is the quantity itself. For constraints of the form "first quantity=second quantity", this deviation is the difference between the two quantities, i.e. "first quantity minus second quantity". The result of this step is a vector of deviation values.
4. Determine whether the deviation vector is within an acceptable tolerance of zero. If it is exactly zero, then the constraints are exactly satisfied. If it is close to zero, then the constraints are approximately satisfied.
5. If the deviation vector is within tolerance, then the solver is complete, and the result is the vector of parameters.
6. For each combination of parameter value and deviation value, compute an approximate value of how an infinitesimal change to the parameter will affect the deviation. The result of this step is a matrix. Further, this matrix is sparse and can be represented in band-diagonal form because changes to parameters only affect the deviations at the left and right endpoints.
7. Invert the matrix generated in step 6, above. While inversion of arbitrary matrices is fairly expensive computationally, efficient algorithms exist for inverting matrices in band-diagonal form. See Numerical Recipes in C, $2^{nd}$ ed. by William H. Press, Brian P. Flannery, Saul A. Teukolsky, William T. Vetterling. Cambridge University Press, 1992.
8. Compute the dot product of the inverted matrix and the deviation vector, resulting in an update vector.
9. Subtract the update vector from the parameter vector, resulting in a refined parameter vector.
10. Go back to step 2 and repeat the process.

Evaluation of Tangent Angles, Curvatures, and Derivatives of Curvature

A central sub-problem of the constraint solver (step 2 of the above section) is to evaluate the tangent angles, curvatures, and derivatives at each of the two endpoints (control points) of each polynomial spiral segment, given the four parameters of the polynomial spiral.

Figure 5:
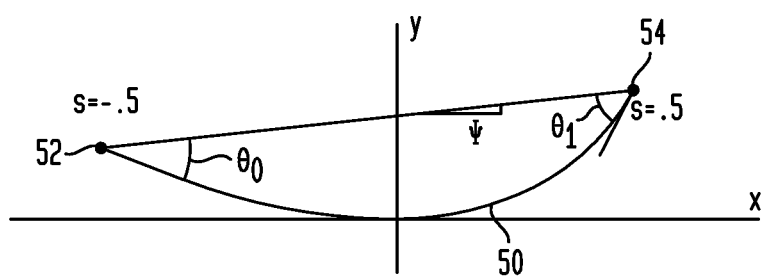
FIG. 5 shows a unit-length normalized polynomial spiral segment for use in conjunction with the present invention.

The standard representation of a third-order polynomial spiral segment is as a vector of four quantities measured at the arclength midpoint of the segment normalized to unit length: curvature, and the first three derivatives of curvature. By convention, the midpoint has Cartesian coordinates at the origin (0,0), and has a tangent angle of zero, i.e. parallel to the horizontal axis. FIG. 5 shows an example of such a segment 50 between a first and second endpoints 52, 54.

Using a Taylor's series expansion, the curvature of segment 50 measured at arclength s from this central point, (i.e. s ranges from −0.5 to 0.5), is:

$$k(s)=k0+k1s+½k2s^2+⅙k3s^3$$

The tangent angle at each point along the curve 50, measured in terms of the arclength parameter s, can be determined by simple integration of this curvature value:

$$theta(s)=k0s+½k1s^2+⅙k2s^3+\tfrac{1}{24}k3s^4$$

The Cartesian coordinates of each point along the curve 50, measured in terms of the arclength parameter s, can be determined by numerical integration of the sine and cosine of the tangent angle.

$$x(s)=\text{integral (from 0) (to }s)\cos theta(t)dt$$

$$y(s)=\text{integral (from 0) (to }s)\sin theta(t)dt$$

The chordlength of this segment, which is equal to the ratio of chordlength divided by arclength because the arclength is unity, is simply the Pythagorean distance between the two endpoints, represented in Cartesian coordinates as (x(−0.5), y(−0.5)) and (x(0.5), y(0.5)), respectively. Thus, this value is sqrt((y(0.5)−y(−0.5))^2+((x(00.5)−x(−0.5))^2)). The unit-length normalized segment is then rotated and scaled so that its endpoints match the control points given as input to the constraint solving problem. The scale factor is equal to the chordlength between the control points divided by the chordlength of the unit-length normalized segment.

Similarly, the rotation angle is equal to the angle of the vector from the left control point to the right control point, minus the angle of the vector from the left endpoint to the right endpoint of the unit-length normalized segment (the latter angle is marked by the Greek letter psi in FIG. 5).

With these values (the scale factor and rotation angle), the tangent angles, curvatures, and derivatives can be readily calculated for all points along the curve, including the two endpoints.

$$\begin{aligned}\text{tangent angle}(s) &= (\text{rotation angle}) + theta(s)\\ &= (\text{rotation angle}) + k0\,s + 1/2\ k1\ s\wedge 2 +\\ &\quad 1/6\ k2\ s\wedge 3 + 1/24\ k3\ s\wedge 4\end{aligned}$$

$$\begin{aligned}\text{curvature}(s) &= k(s)/(\text{scale factor})\\ &= (k0 + k1\,s + 1/2\ k2\ s\wedge 2 + 1/6\ k3\ s\wedge 3)/\\ &\quad (\text{scale factor})\end{aligned}$$

$$\begin{aligned}\text{curvature}'(s) &= k'(s)/(\text{scale factor})\wedge 2\\ &= (k1 + k2\,s + 1/2\ k3\ s\wedge 2)/(\text{scale factor})\wedge 2\end{aligned}$$

$$\begin{aligned}\text{curvature}''(s) &= k'(s)/(\text{scale factor})\wedge 3\\ &= (k2 + k3\,s)/(\text{scale factor})\wedge 3\end{aligned}$$

These four formulae are then evaluated at s=−0.5 and s=0.5, resulting in the values for the left and right endpoint, respectively.

Figure 6B:
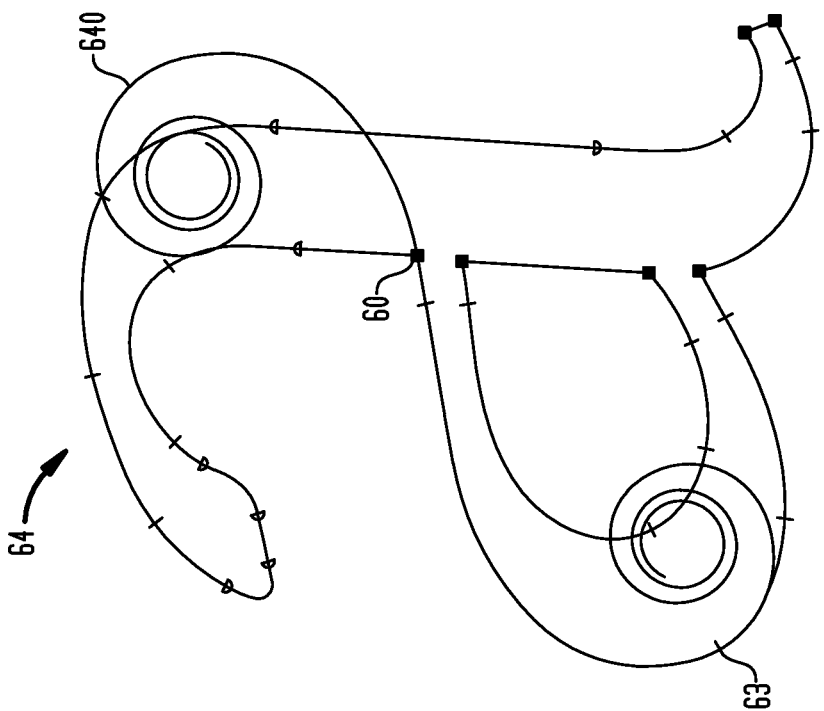
FIG. 6B shows a typical font outline generated using the present invention, with an Euler spiral overlaying one such segment.
Figure 6A:
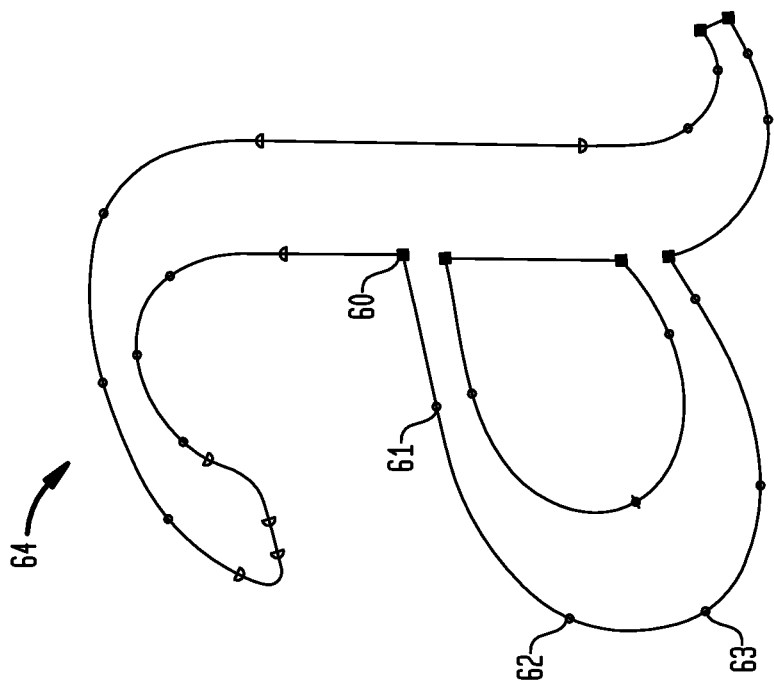
FIG. 6A shows a typical font outline generated using the present invention.

FIG. 6A illustrates an "a" letter 64 generated for a typical font outline. Although the curve generation in accordance with the present invention determines only the outline of the "a" letter 64, it will be understood that when printing and displaying the letter outline 64, the interior of the curve will be a solid color (typically black).

The control points such as 60, 61, 62 and 63 in FIG. 6A identify the font outline. In accordance with the present invention, a portion of a Euler spiral 640 is fitted between control points 60 and 63 in FIG. 6B. The power of the present invented algorithm for fitting curves between control points is illustrated by the fact that a single Euler spiral 640 passes through all four control points 60, 61, 62 and 63.

Figure 9A:
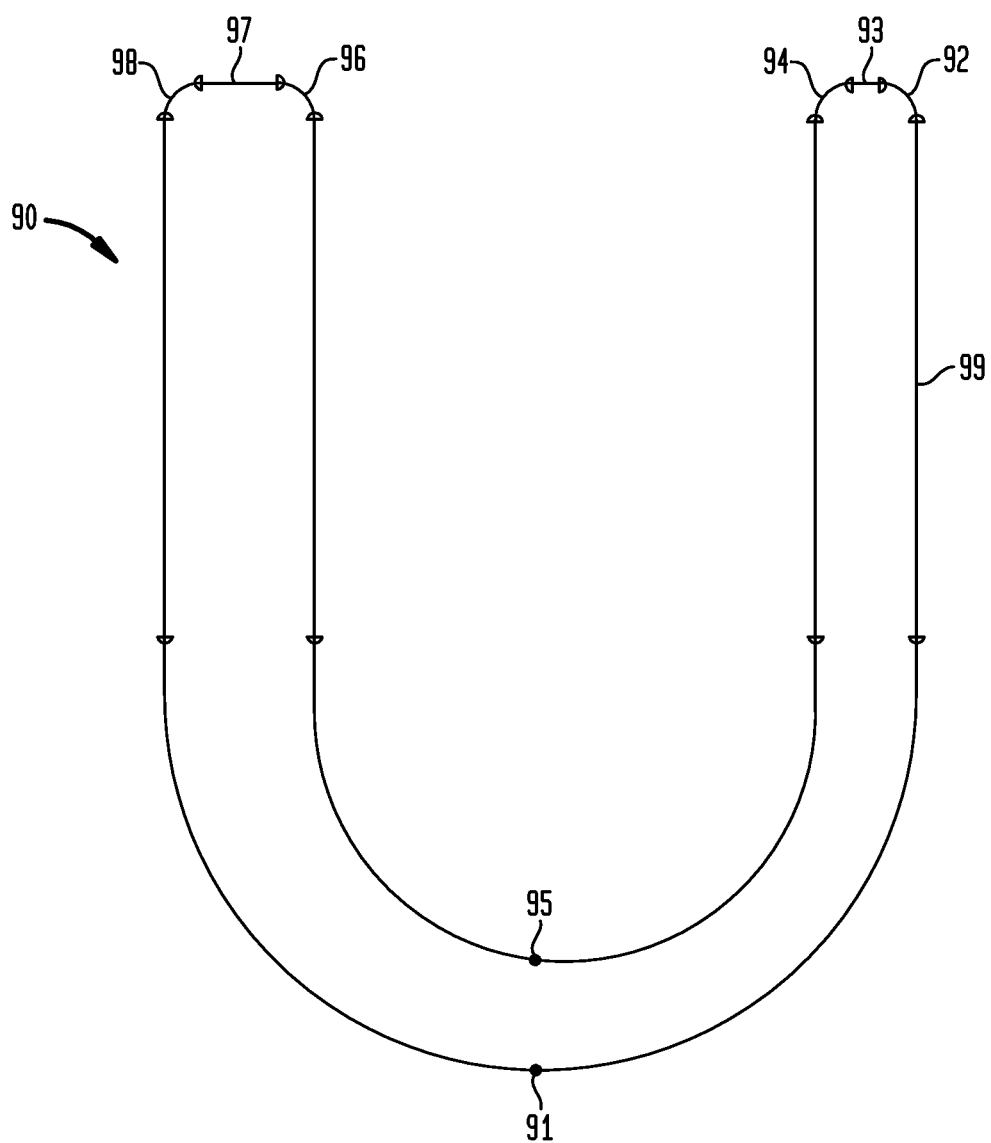
FIG. 9A shows a font outline for a "U" letter in accordance with the present invention.
Figure 9B:
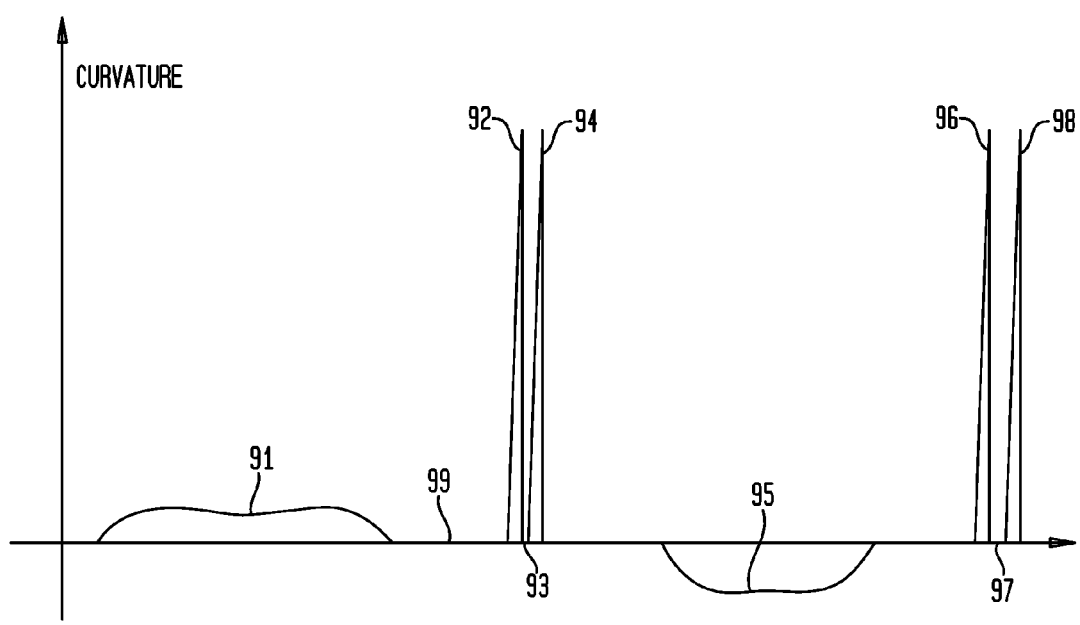
FIG. 9B is a plot showing curvature as a function of arclength for the font outline of the "U" letter in FIG. 9A in accordance with the present invention.

FIG. 9A illustrates a font outline for an asymmetrical "U" letter 90. The plot in FIG. 9B shows curvature as a function of arclength for the font outline of the "U" letter 90 in FIG. 9A.

The peak curvature points 92, 94, 96, 98 correspond to the corresponding curve segments 92, 94, 96, 98 in FIG. 9A. In between, the short straight sections 93 and 97 in FIG. 9A correspond to the zero curvature segments 93 and 97 in FIG. 9B. Similarly, the large curved section 91 and the small curved section 95 in FIG. 9A correspond to the positive curvature 91 and negative curvature 95 in FIG. 9B. Note the smooth transitions between straight sections (such as segment 99) and curve segments (such as segment 92).

What is claimed is:

1. A computer-implemented method, comprising:
    obtaining, at a computing device, an initial vector of parameter values that defines a curve comprising a plurality of segments, each segment of the plurality of segments being defined by four scalar parameters and extending between two endpoints; and
    determining, at the computing device, a final vector of parameter values for the curve, wherein determining the final vector of parameter values comprises utilizing an iterative process to analyze whether a set of constraints are met at each endpoint, the iterative process including:
    (i) analyzing a current vector of parameter values to determine a vector of deviation values based on deviation from the set of constraints for each endpoint,
    (ii) determining whether the vector of deviation values is within a tolerance,
    (iii) when the vector of deviation values is within the tolerance, setting the current vector of parameter values as the final vector of parameter values, and
    (iv) when the vector of deviation values is not within the tolerance:
        (a) computing a change matrix based on how a change to the current vector of parameters will change the vector of deviation values,
        (b) inverting the change matrix to obtain an inverted change matrix,
        (c) obtaining an update vector by computing a dot product of the inverted change matrix and the vector of deviation values,
        (d) obtaining a refined vector of parameter values by subtracting the update vector from the current vector of parameter values, and
        (e) setting the refined vector of parameter values as the current vector of parameter values to be analyzed.

2. The computer-implemented method of claim 1, wherein the four scalar parameters are curvature, first derivative of curvature, second derivative of curvature, and third derivative of curvature at a midpoint of each segment.

3. The computer-implemented method of claim 1, further comprising outputting, from the computer device, the final vector of parameter values for the curve.

4. The computer-implemented method of claim 1, wherein computing the change matrix based on how the change to the current vector of parameters will change the vector of deviation values comprises computing the change matrix based on how an infinitesimal change to the current vector of parameters will change the vector of deviation values.

5. The computer-implemented method of claim 1, wherein the set of constraints comprises at least one of tangent angle, curvature, first derivative of curvature, and second derivative of curvature.

6. The computer-implemented method of claim 5, wherein the set of constraints specifies that the tangent angle, curvature, first derivative of curvature, and second derivative of curvature are equal across each endpoint.

7. The computer-implemented method of claim 5, wherein the set of constraints specifies that: (i) the tangent angle and curvature are equal across each endpoint, and (ii) the second derivative of curvature is zero on both sides of each endpoint.

8. The computer-implemented method of claim 5, wherein the set of constraints specifies that: (i) the tangent angle and curvature are equal across each endpoint, and (ii) both the first and second derivatives of curvature are zero on one side of each endpoint.

9. The computer-implemented method of claim 8, wherein a first segment on a first side of a specific endpoint is a straight line and a second segment on a second side opposite the first side of the specific endpoint is a curved segment.

10. The computer-implemented method of claim 1, wherein each specific segment of the plurality of segments has a curvature and an arclength at each point along the specific segment, the curvature at each specific point of the specific segment being a polynomial function of the arclength corresponding to that specific point.

11. The computer-implemented method of claim 1, further comprising:
    generating, at the computing device, the curve based on the final vector of parameter values; and
    outputting, from the computer device, the curve to a display device or printer.

12. A computer-implemented method, comprising:
    obtaining, at a computing device, an initial vector of parameter values that defines a curve comprising a plurality of segments, each segment of the plurality of segments being defined by four scalar parameters and extending between two endpoints; and
    determining, at the computing device, a final vector of parameter values for the curve, wherein determining the final vector of parameter values comprises utilizing an iterative process to analyze whether a set of constraints are met at each endpoint, the iterative process including:
    (i) analyzing a current vector of parameter values to determine a vector of deviation values based on deviation from the set of constraints for each endpoint,
    (ii) determining whether the vector of deviation values is within a tolerance,
    (iii) when the vector of deviation values is within the tolerance, setting the current vector of parameter values as the final vector of parameter values, and
    (iv) when the vector of deviation values is not within the tolerance, obtaining a refined vector of parameter values by modifying the current vector of parameter values and setting the refined vector of parameter values as the current vector of parameter values to be analyzed.

13. The computer-implemented method of claim 12, wherein the set of constraints comprises at least one of tangent angle, curvature, first derivative of curvature, and second derivative of curvature.

14. The computer-implemented method of claim 13, wherein the set of constraints specifies that: (i) the tangent angle and curvature are equal across each endpoint, and (ii) the second derivative of curvature is zero on both sides of each endpoint.

15. A method for solving curvature constraints for a sequence of polynomial spiral segments, said method comprising:
- selecting, at a computing device, four scalar parameters for a curve whose curvature is a polynomial function of arclength;
- computing, at the computing device, a set of constraints at the controls points at each of the segments, comprising of tangent angles, curvatures, and first and second derivatives of curvature;
- computing, at the computing device, a vector of deviation values for each constraint; and
- generating, at the computing device, a vector of parameters values if the said vector of deviation values is within tolerance.

16. The method of claim 15, further comprising:
- generating, at the computing device, an inverted matrix measuring how an infinitesimal change to said vector parameter values will affect the said vector of deviation values;
- generating, at the computing device, an update vector on the dot product between said inverted matrix and said vector of deviation values; and
- generating, at the computing device, a refined parameter vector by subtracting said update vector from said vector of parameters values.

17. The method as in claim 15, wherein a constraint from said set of constraints specifies that the tangent angle, curvature, and first and second derivative of the curvature must be equal across a said control point.

18. The method as in claim 15, wherein a constraint from said set of constraints specifies that the tangent angle and curvature must be equal across said control point, and the second derivative of curvature must be zero on both sides of a said control point.

19. The method as in claim 15, wherein a constraint from said set of constraints specifies that the tangent angle and curvature must be equal across said control point, and both the first and second derivative of curvature must be zero on one side of said control point.

20. The method of claim 19, wherein the segment on one side of a said control point is a straight line and the segment on the second side of said control point is a curved segment.

* * * * *